No. 647,121. Patented Apr. 10, 1900.
G. F. SIMMONDS.
MILK HEATER AND AERATOR.
(Application filed Apr. 1, 1899.)
(No Model.) 2 Sheets—Sheet 1.
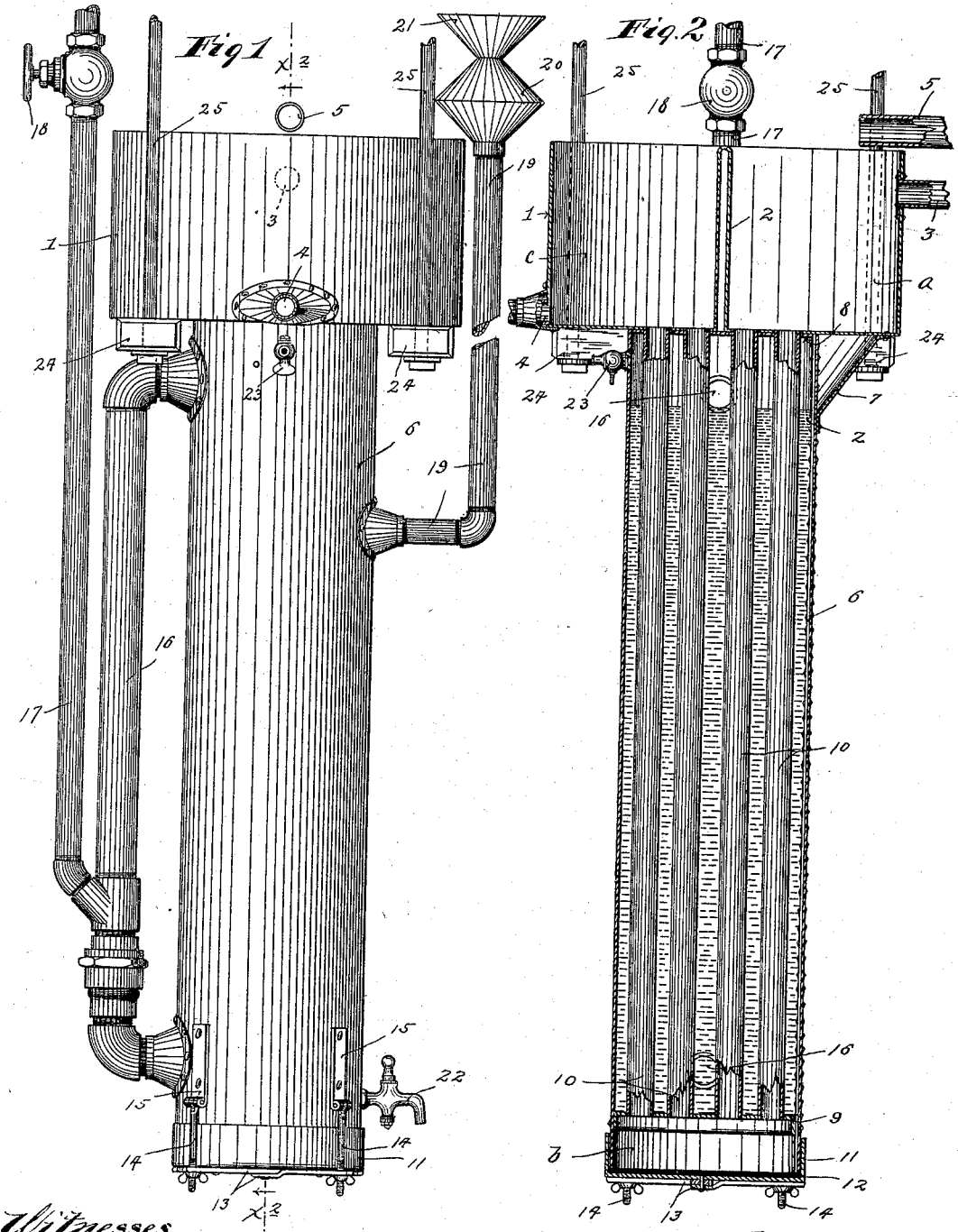
Witnesses,
Harry Kilgore,
F. D. Merchant,
Inventor
George F. Simmonds
By his Attorney,
Jas. F. Williamson

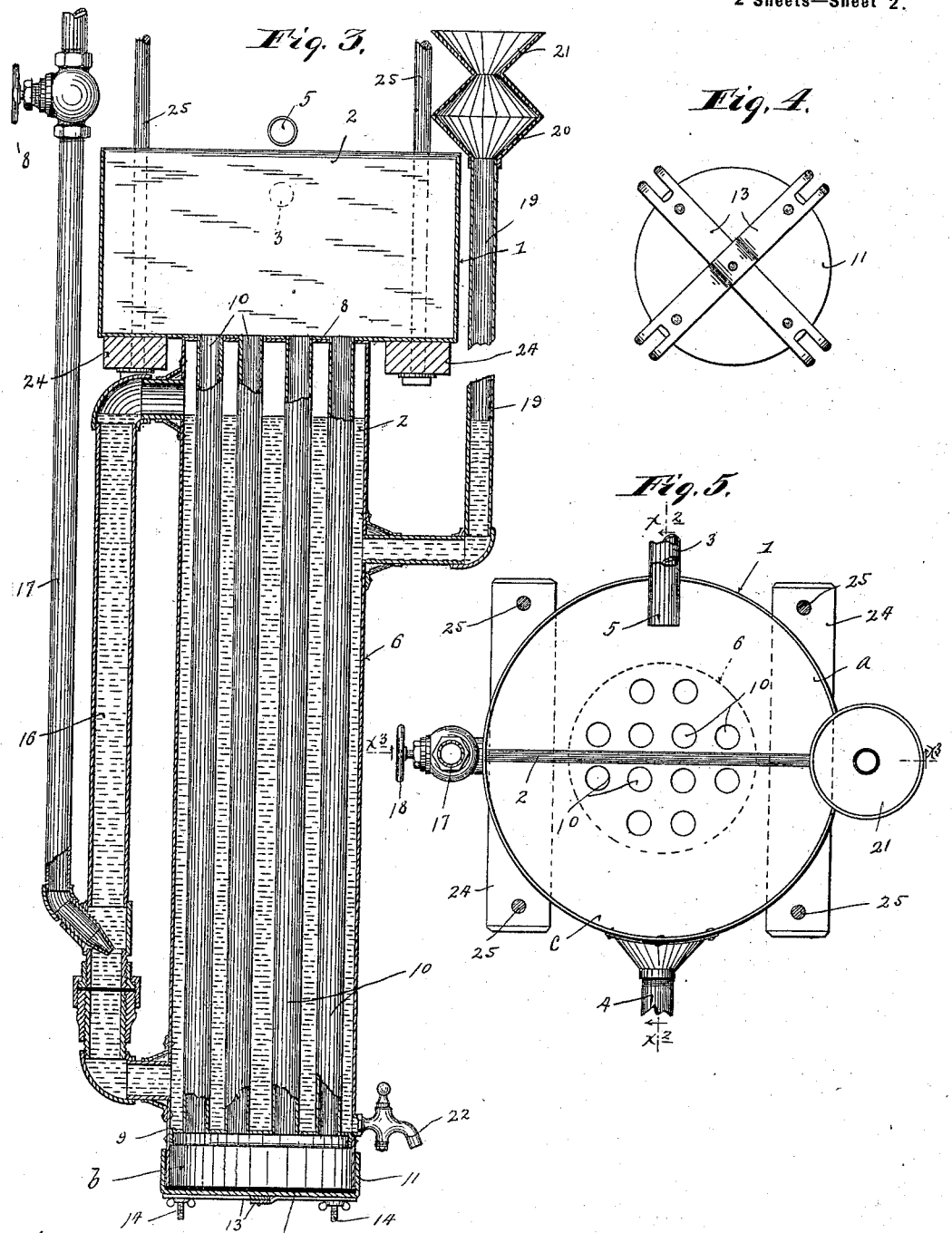

UNITED STATES PATENT OFFICE.

GEORGE F. SIMMONDS, OF LITCHFIELD, MINNESOTA.

MILK HEATER AND AERATOR.

SPECIFICATION forming part of Letters Patent No. 647,121, dated April 10, 1900.

Application filed April 1, 1899. Serial No. 711,324. (No model.)

*To all whom it may concern:*

Be it known that I, GEORGE F. SIMMONDS, a citizen of the United States, residing at Litchfield, in the county of Meeker and State of Minnesota, have invented certain new and useful Improvements in Milk Heaters and Aerators; and I do hereby declare the following to be a full, clear, and exact description of the invention, such as will enable others skilled in the art to which it appertains to make and use the same.

To those familiar with the creamery business it is well known that it is desirable to heat the fresh milk and to aerate the same before the milk has passed to the separator.

My invention has for its object to provide an efficient machine for accomplishing the above-named results. To this end my invention consists of the novel devices and combinations of devices hereinafter described, and defined in the claims.

The invention is illustrated in the accompanying drawings, wherein like notations refer to like parts throughout the several views.

Figure 1 is a view in elevation, with some parts broken away and others shown in section, illustrating the preferred form of my machine. Fig. 2 is a vertical section on the line $x^2 \, x^2$ of Figs. 1 and 5. Fig. 3 is a vertical section on the line $x^3 \, x^3$ of Fig. 5, or at right angles to the section shown in Fig. 2. Fig. 4 is a bottom plan view of the lower end cap of the heater-shell removed. Fig. 5 is a plan view of the machine with some parts broken away and others shown in section.

The numeral 1 represents a suitable receptacle, shown as divided by a vertical partition 2 into a pair of compartments $a$ and $c$, both of which are open at their top to the atmosphere and serve, respectively, as the receiving and the discharge chambers of the aerator. The receiving-chamber $a$ is shown as provided near its top with an overflow outlet-pipe 3. The discharging-chamber $c$ is shown as provided near its bottom with an outlet-pipe 4, which leads to the separator. (Not shown.) The milk is introduced into receiving-chamber $a$ through a pipe 5, connected with the storage vat or receptacle, (not shown,) and through which when running the fresh milk flows, either by gravity or by some means for forcing the circulation, such as a pump. (Not shown.)

To the under surface of the aerator, as shown, is rigidly secured the upper end of a heater-shell 6. This shell 6 may be secured to the bottom of the aerator in any suitable way. It is shown as riveted thereto and as reinforced by a suitable brace or braces 7. The shell 6 is provided with an upper tube-sheet 8, flush with the rim of the shell 6, and with a lower tube-sheet 9, set inward a short distance from the lower end of the shell. The sheets 8 and 9 are connected by tubes 10, which form part of the circulating connections for the milk, as will later more fully appear. The downward extension of the heater-shell 6 is closed at its lower end by a suitable cap 11, which telescopes therewith and is provided with a suitable gasket 12, preferably of cork, for insuring a tight joint between the shell and the cap when the parts are clamped together. The cap 11 is provided on its outer or under surface with a pair of cross-bars 13, notched at their outer ends, as best shown in Fig. 4, and adapted to be engaged by nutted draw-bolts 14, pivoted to hinge-lugs 15, which are rigidly secured to the shell 6, as best shown in Fig. 1. The notched ends of the bars 13 project, of course, beyond the rim of the cap 11 for engagement with the draw-bolts 14, as shown in Figs. 1, 2, and 3.

The downward extension of the shell 6 below the tube-sheet 9, in coöperation with the cap 11, affords a chamber $b$ below the tubes 10, which coöperates as one of the chambers for the circulation of the milk.

The opposite end portions of the shell 6 are connected by a water-circulating pipe 16. The pipe 16 is tapped by a steam-supply pipe 17, leading to a suitable source of supply and provided with a suitable hand-valve 18. The steam-supply pipe 17 taps the water-circulating pipe 16 in such a way as to discharge the steam within the pipe 16 in the direction of movement desired for the water in its travel through said pipe 16.

At some suitable point the shell 6 is tapped by a pipe 19, which extends upward to a point above the level of the water within the shell. This pipe 19 serves for the exhaust of the steam and for filling the shell 6 with water.

At its upper end the pipe 19 is shown as provided with a section 20 in the form of a double cone and a section 21 in the form of a single cone. These conical sections 20 serve as expansion-chambers for the steam and splash-chambers for the water, with baffle plates or surfaces which prevent the water from being ejected by the steam.

At its lower end the shell 6 is shown as provided with a waste-cock 22, and at its upper end the said shell is provided with an air-vent valve 23, as shown best in Fig. 1.

The machine is designed to stand in an upright position and is preferably suspended from some overhead support. As shown, the aerating-receptacle 1 and the heater-shell 6 are both of cylindrical form, with the latter of less diameter than the former. Hence the aerator 1 projects beyond the top of the heater-shell 6 in all directions and affords a convenient means for the attachment of the lower bars 24 of suitable hangers 25, secured to an overhead support. (Not shown.) In this way the machine is held at a suitable distance above the floor, so as to permit ready access to the interior of the heater when desired by removing the lower end cap 11.

Having regard now to the action or operation of the machine, it is obvious that the milk will pass from the receiving-chamber $a$ of the aerator down through those members of the tubes 10 which terminate above in registration with the openings in the bottom of compartment $a$ of the aerator, and thence will pass into the lower end chamber $b$ and back upward through the other set of said tubes 10, which terminate above in registration with the openings in the bottom of the discharging-compartment $c$ of the aerator. Thence the milk will pass out through the discharge-pipe 4, leading to the separator. From the foregoing it is obvious that the milk passes twice through the hot-water heater in its movement or circulation from the receiving-chamber $a$ to the discharging-chamber $c$ of the aerator. It is also obvious that this circulation is effected under the action of gravity. As both chambers $a$ and $c$ are open at their tops, the atmosphere has free access to the milk in both chambers $a$ and $c$ of the aerator. Hence opportunity is afforded for the commingling of a large quantity of air with the milk in the course of its circulation.

The improved form of heater herein disclosed as part of this apparatus is a highly-important feature for the purpose had in view. It is of course well known that hot water is the best medium for heating the milk, as all other means hitherto employed result in scorching the milk. Difficulty, however, has been experienced in applying hot water for this purpose, for the reason that hitherto, so far as I am aware, it has not been possible to maintain a uniform temperature throughout the body of the water. By my improvements herein disclosed I overcome this difficulty.

By actual practice I have found that the water will be continuously circulated through the shell 6 and the pipe 16 under the action of the steam from the steam-supply pipe 17 and that the water will be of uniform temperature in all parts of the shell 6. Hitherto the hot water has accumulated at the top of all water-heaters and a very considerable difference in temperature was noticeable between the top and bottom of the water column. With my improved heater herein disclosed the temperature of the water is uniform throughout. The circulation of course is rapid and is induced by the flow of the steam within the pipe 16 from the outlet or discharge nozzle of the steam-pipe 17.

By actual experience I have demonstrated the efficiency of the entire apparatus herein disclosed for the purposes had in view.

It will be understood, of course, that the machine is capable of modifications in form and the details may be changed without departing from the spirit of my invention.

It is of course obvious that the purpose of the air-vent valve 23 is to permit the escape of air from the heater when filling the same with water. The water-level is shown at $z$ in Figs. 2 and 3.

What I claim, and desire to secure by Letters Patent of the United States, is as follows:

1. An apparatus for heating liquids comprising in combination, an upper end receptacle divided into receiving and discharge chambers, $a$ and $c$, respectively, by the transverse vertical partition 2, the heater directly below said upper end receptacle comprising the shell 6 with the bottom chamber $b$, the tubes 10 connecting the chambers $a$, $b$ and $c$, as described, the outside water-circulating pipe 16 connecting the upper and lower end portions of the shell 6, and the steam-supply pipe 17 tapping said circulating-pipe 16 and discharging therein, in the desired direction of the movement of the water, substantially as described.

2. The combination with a hot-water heater, comprising a closed vertical shell, having its end portions connected by an outside water-circulating pipe, which water-pipe is tapped by a steam-supply pipe discharging therein, in the direction of movement desired for the water, of an aerator having separate receiving and discharge chambers open to the atmosphere, which aerator is of larger cross-section than the hot-water heater and is attached to the upper end of the heater, and milk-circulating connections, extending through the body of said heater and connecting the said receiving and discharge chambers of said aerator, substantially as described.

3. The apparatus for heating and aerating milk comprising the open-topped receptacle 1 divided by the partition 2 into the receiving-chamber $a$ and the discharging-chamber $c$, the heater directly below the aerator 1 comprising the shell 6 with the tube-sheets 8 and 10, the bottom chamber $b$ with removable cap 11, the tubes 10 connecting the chambers $a$, $b$ and $c$ as described, the water-circulating pipe 16 connecting the opposite end portions of the shell 6, the steam-supply pipe 17 tapping the water-circulating pipe 16 and discharging therein in the direction of the water movement, as described, and the pipe 19 with the chambers 20 and 21, all for coöperation substantially as described.

In testimony whereof I affix my signature in presence of two witnesses.

GEORGE F. SIMMONDS.

Witnesses:
M. M. McGRORY,
JAS. F. WILLIAMSON.